United States Patent [19]
Mouton, Jr. et al.

[11] 3,986,787
[45] Oct. 19, 1976

[54] RIVER TURBINE

[76] Inventors: William J. Mouton, Jr., P.O. Box 10515, New Orleans, La. 70181; David F. Thompson, Box 183, Darby, Pa. 19023

[22] Filed: Oct. 15, 1975

[21] Appl. No.: 622,567

Related U.S. Application Data

[63] Continuation of Ser. No. 467,772, May 7, 1974, abandoned.

[52] U.S. Cl. ............................. 415/7; 415/DIG. 1; 290/54; 415/148; 415/121 G
[51] Int. Cl.² ........................................ F01D 25/28
[58] Field of Search .................................. 415/2–4, 415/7, 121 G, 161, DIG. 1, 122 A; 290/54, 55; 210/448; 60/39.09 P; 416/85, 189

[56] References Cited
UNITED STATES PATENTS

| | | | |
|---|---|---|---|
| 61,362 | 1/1867 | Rowe | 415/7 |
| 328,593 | 10/1885 | Main | 415/7 |
| 507,294 | 10/1893 | Vance | 415/7 |
| 1,123,491 | 1/1915 | Corbin | 290/54 |
| 1,147,658 | 7/1915 | Stokes | 416/85 |
| 1,312,021 | 8/1919 | Dickinson | 290/55 |
| 1,396,609 | 11/1921 | Weisenborn | 415/7 |
| 1,420,665 | 6/1922 | Newcombe | 415/121 G |
| 1,790,969 | 2/1931 | Bray | 416/189 |
| 1,903,545 | 4/1933 | Hampton | 415/121 G |
| 2,278,178 | 3/1942 | Lannert | 210/448 |
| 2,689,680 | 9/1954 | Lovesey | 415/161 |
| 3,196,598 | 7/1965 | Olson | 60/39.09 P |
| 3,620,640 | 11/1971 | Lariviere | 415/DIG. 1 |
| 3,680,977 | 8/1972 | Rabouyt | 415/172 |

FOREIGN PATENTS OR APPLICATIONS

| | | | |
|---|---|---|---|
| 26,223 | 4/1923 | France | 415/DIG. 1 |
| 866,053 | 3/1941 | France | 415/DIG. 1 |
| 891,697 | 12/1943 | France | 415/DIG. 1 |
| 975,625 | 10/1950 | France | 415/2 |
| 1,007,883 | 2/1952 | France | 415/4 |
| 1,207,181 | 10/1959 | France | 415/122 A |
| 56,102 | 6/1952 | France | 415/144 |
| 729,534 | 12/1942 | Germany | 415/4 |

*Primary Examiner*—Henry F. Raduazo
*Attorney, Agent, or Firm*—Rollin D. Morse

[57] ABSTRACT

A turbine wheel on a horizontal shaft is coaxially mounted within a primary nozzle, for support in a river current below a platform carrying electrical power generation equipment. The turbine shaft and primary nozzle are submerged and oriented to enable flow of a portion of river current through the nozzle and past the turbine wheel.

The external surface of the nozzle is shaped and has structure to accelerate and/or direct the flow of the adjacent surrounding mainstream river current in a manner to generate a sheath which aids the efflux of that portion of the river current which has passed through the turbine. Part of the said structure is a secondary nozzle surrounding the primary nozzle; the secondary nozzle is arranged to accentuate the control of the surrounding mainstream river current. Bearing means, support means, power take-off means, speed control means and blade shapes are disclosed.

10 Claims, 18 Drawing Figures

RIVER TURBINE

This is a continuation of application Ser. No. 467,772, now abandoned, filed May 7, 1974.

OBJECTS

Objects of the present invention include the following:

1. Harnessing some of that part of the sun's energy represented in the rainfall collected in the flowing streams of water in rivers.
2. Extracting energy from flowing river streams without the construction of expensive dams.
3. Extracting energy from rivers in places where soil and geographic conditions make the use of dams impossible.
4. Extracting energy from a part of river currents without foreclosing the use of the river for navigation.
5. Enabling the shifting and re-shifting of energy extraction means to those parts of a river where the currents are optimum.
6. Application of modern technology and materials of construction for the building of large navigable power plants of high efficiency and moderate cost.
7. Enabling the production of electrical power in large quantities, with precise control of frequency and synchronization such that the power can be merged with conventional electrical power generation systems, despite fluctuations in river flow.

GENERAL DESCRIPTION OF PRIOR ART SITUATION

Water power plants associated with the use of dams to impound the water, and pass it through waterwheels, (and in later times through turbines) have undergone centuries of development. As a result, where dams can be used, and where a good fall of water is available, such power plants can be highly efficient, and are used throughout the world for the generation of electric power.

There are many situations, however, where (1) damming of the flowing water is prohibitively expensive, (2) is impossible because of soil conditions, (3) is impossible because of geographic conditions, or (4) is impracticable because of navigational needs for the flowing water. Among the situations preventing the successful use of impounded water for hydroelectric purposes are the following:

1. Deep layers of alluvial soil overlaying impossibly deep bed rock, whereby construction of foundations for dams is totally impractical.
2. Broad flat valleys, such that small rises in water level would inundate huge acreages of valuable land, and small drops in water level would lay bare large areas of mud flats.
3. Related to the above, lack of nearby mountain ridges between which dams could be built.

The Mississippi River, is an outstanding example, exhibiting all of the above situations, yet at the same time represents the loss of huge amounts of solar energy. This solar energy is that which was used by Nature in moving the water through the sequence from ocean to cloud to sky above the Mississippi's watershed. Once in the river, the energy of the river shows up in two forms, namely, (1) the hydraulic gradient of the water as it flows downhill from sources to outlet, and (2) the kinetic energy of the moving mass of water.

The hydraulic gradient of the natural Mississippi River is very slight, being for much of the river lower than 2 inches per mile.

If one considers an appropriate machine for extracting energy from the potential energy in the static pressure drop of a stream of water travelling at about 5 mph, and falling 0.002 ft. in a 100 ft. machine length it can be calculated that the stream is conveying energy at the rate of only about 0.60 ft. lb./sec. for each square foot of stream, equivalent to about 1/1000 horsepower.

On the other hand, the kinetic energy of this stream is very much larger. It can be calculated that the same square foot of stream will be bringing kinetic energy into the machine at a rate of about 380 ft. lb./sec., which is about 0.7 horsepower, or 700 times larger.

Many efforts were made in the late 1800's and early 1900's to harness the flowing currents of rivers without using dams. These river current motors were supposed by their inventors to recover energy from the velocity of the moving currents of water, and to convert this energy to some other more useful form. The driving of a generator of electricity was one commonly envisioned form.

Study of this old art of river current motors reveals that they were all invented on the basis of a poor understanding of hydrodynamics, and a consequent false premise. The prior art seems to indicate that a river current motor, inserted into a river current, can remove part of the kinetic energy from the water and yet have the water proceed without loss of velocity through the motor.

Such a situation is no more possible than is perpetual motion. What actually happened upon introduction of a prior art river current motor into a stream, was that the motor acted as an obstruction to the flow of the stream, and the obstruction resulted in a build-up of pressure upstream of the motor, by a local rise in river level. As a consequence, part of the river flow that formerly went through the region of the motor, flowed instead around the motor. Since the path for flow of the water around the motor was not much longer nor more tortuous than the path through the motor, only a small fraction of the desired stream of water was passed through the motor; and this stream was moving more slowly than the main stream. Accordingly, little of the river's energy was extracted, and the prior art river current motors were extremely inefficient.

Little attention had been given in these prior art devices to obtaining smooth flow with least possible friction and turbulence from the mainstream, into the water wheel, and back into the mainstream. The turbines shown were highly inefficient, and many versions used ineffective screws or multiple wheels closely following one another; no attention was given to improving the downstream environment to ease the reentrance of the portion of the current from which energy was supposed to have been extracted.

SUMMARY OF THE PRESENT INVENTION

The river current motor of the present invention is based on the principal premise that in order to remove kinetic energy from a moving mass of water, without thereby reducing the mass rate of flow, it is necessary to provide immediately downstream of the energy removal device, a region into which the mass of treated water is impelled to move, and simultaneously, that the mainstream of water is impelled to move away from this region. Subsidiary to this principal premise, the present invention also employs novel configurations using accepted hydrodynamics principles, to take fullest possible advantage of the passing river stream, utilizing and recovering not only part of the energy in that portion of the river stream actually intercepted by this river turbine, but also utilizing part of the energy of the mainstream to prepare a favorable downstream region for the discharge of the intercepted portion.

The objects of the invention, and others, are accomplished in a river current motor of the type made up of a primary nozzle with longitudinal horizontal axis, immersed in said river with axis parallel to the river current direction, for collecting a portion of the river current from the mainstream of said current, the said primary nozzle having in sequence along its axis an entrance end connected to a through-going waterway, leading to a throat and then through a tailpiece to a discharge end, and coaxially supporting within the throat an axial-entrance turbine wheel to which is connected means for transferring mechanical rotational energy to external utilization means, the improvement comprising the following:

a. the flaring of the waterway from the throat to the discharge end to initiate and establish a gradually increasing cross section of the collected portion of said river current from the time it passes said turbine wheel, and b. the flaring and structuring of the exterior of said primary nozzle to initiate and establish the formation of a diverging conical sheath of mainstream river current around the said collected portion as said portion exits the discharge end of said primary nozzle.

In one preferred form, the turbine wheel carries at its periphery a shroud ring, the throat of the waterway has a cooperating annular recess, receiving the shroud ring, and the inner diametrical surface of the shroud ring is an extension of the inner surface of the throat of the waterway.

Also in preferred form, the outer rim of the shroud ring is a pulley on which is carried at least one endless belt leading through channels in the structure of the primary nozzle to energy utilization means.

And in preferred form, a trash screen is provided in the river upstream of the entrance end of the primary nozzle, the trash screen comprising a conical array of cables on horizontal axis, the tip of the cone being attached to an upstream anchor cable and the base of the cone forming an open end of at least as large a cross section as the entrance end of the primary nozzle, to which the said open end is juxtaposed and attached. For minimum flow resistance, the included angle within the cone is preferably about 30°.

Preferably, the waterway within the primary nozzle converges smoothly from an initial intercepting cross section at the mouth or entrance end to a smaller cross section at the throat, whereby the velocity of the portion of the river current intercepted by the nozzle is accelerated before impingement upon the turbine wheel blades, and the efficiency of energy transfer thereby increased. The area ratio for the said cross sections may be in the range of 1:1 to 4:1.

In one form, the turbine wheel is of the purely axial flow type, and the tail piece of the waterway downstream from the turbine wheel flares at an included angle of up to 15°, preferably about 7°. With this form the tail piece may have an axial length of at least one half of the diameter of the throat of the waterway.

It is important to the success of this invention not only that the waterway of the primary nozzle have the characteristics enumerated above, but also that the exterior be flared and structured with mechanical elements to promote the flow of a diverging conical sheath of mainstream water adjacent to and surrounding the collected portion as that portion exits the discharge end of the primary nozzle. Thereby an environment is provided in the mainstream into which the collected portion is discharging, such that the collected portion can flow away under the impulse of its remaining static head pressure and remaining velocity head. Preferably, the mainstream sheath is formed and directed, and its total energy content so reorganized as to aid the flowing away of the collected portion. The forming, directing, and reorganizing are provided for by one or more of the following features of the exterior of the primary nozzle:

1. As aforesaid, the nozzle exterior may begin to flare outwardly in the water flow direction, at an angle as large as will be possible considering that the exterior surface should meet at the discharge end of the waterway with the waterway passage in a well faired thin trailing edge.

2. Structural elements are added to the exterior surface further to effect the desired sheath formation.

3. One such structural element is a vane, or set of vanes, extending radially outward from the surface of the primary nozzle, each such vane having a helically bent or tilted trailing edge. The trailing edge bend or tilt is for the purpose of initiating a rotational impulse in the sheath whereby the sheath develops motion, and a corresponding radially outward pressure gradient. The motion is as a helical sheath. The pressure gradient is distinctly helpful in aiding the discharge of the collected portion of the river current.

4. A further structural element, which may conveniently be supported on the outer extremities of the vanes just mentioned, is a coaxial secondary nozzle of inside dimensions such as to fit around the exterior surface of the primary nozzle, with clearance between the secondary and primary nozzle forming annular passageway for the flow of mainstream water past the exterior surface of the primary nozzle. By providing more clearance at the front or entrance end of the annular passageway than at the back or discharge end, the water picked up at the front is accelerated and discharged at higher velocity, and lower pressure, in which condition the sheath formed is particularly effective in entraining and thereby aiding in the discharge of the collected portion of the river current.

5. A further structural feature is the flaring of the interior and the exterior surfaces of the secondary nozzle in the region near the trailing edges of this nozzle, such as to aid in the formation of the diverging conical sheath of mainstream current.

6. Yet another structural feature is the provision on the exterior of the secondary nozzle near its leading edge of a set of delta-shaped vanes, extending outwardly from the surface, and formed into fragments of a helix or helices, whereby to generate a vortical motion of the mainstream on the outside of the secondary nozzle, in the same manner and for the same reasons as in item (3) above.

It is also possible to form or position these vortex-generating vanes not to generate a single large vortex around the secondary nozzle, but rather to generate many small vortices or eddies along the surface of the secondary nozzle. These eddies, in peeling away from the trailing edge of the nozzle aid in the maintenance of the diverging sheath of mainstream river current. One way of securing this eddy generation is simply the canting of adjacent vanes in opposite direction or hand — one canted to the counterclockwise spiral, the next to clockwise spiral, and so on around the periphery.

7. Yet another structural feature is a set of petal-like flaps extending rearwardly from the trailing edge of the secondary nozzle, hingedly mounted thereto, provided with control means, whereby the flaps may be swung inwardly to reduce the flare of the mainstream sheath, or outwardly to increase the flare, as needed for control of the river current turbine output. In the case of no secondary nozzle, the flaps would be part of the primary nozzle trailing edge.

8. Further to the control of the previously mentioned external sheath, there may be provided adjustable aileron-like trailing edges on the vanes extending from the surface of the primary nozzle, whereby the strength of the helical motion of the sheath may be influenced.

In an alternative form of the turbine wheel and the cooperating diverging waterway from the throat to the discharge end of the primary nozzle, the turbine wheel, rather than being of pure axial flow type, has vanes shaped to enable the portion of river current entering axially into the turbine, to exit with a considerable component of radial flow. In this form the waterway diverges immediately at the turbine discharge region of the throat, having a bell shape at this discharge point, whereby the region into which the partially de-energized water exits may have a large cross section into which the water can flow at low velocity. Downstream from this region, the waterway flare will continue as already described.

In other forms of the axial-flow turbine wheel its blades, rather than extending directly from hub to shroud ring, are preshaped into elements bowed in the flow direction that under load form catenaries, such that the main stresses in the blades are tensile stresses. In one catenary variation, each blade is bowed into an open U-shape, with axis of symmetry of the catenary between the two ends of the U, and parallel to the axis of the turbine wheel. In another catenary variation each blade constitutes nearly one half of the catenary, and the axis of symmetry is concentric with the turbine's axis. The blades may be towed also in their rotational direction, as hereinafter detailed.

DETAILED DESCRIPTION OF THE INVENTION

Figure 1:
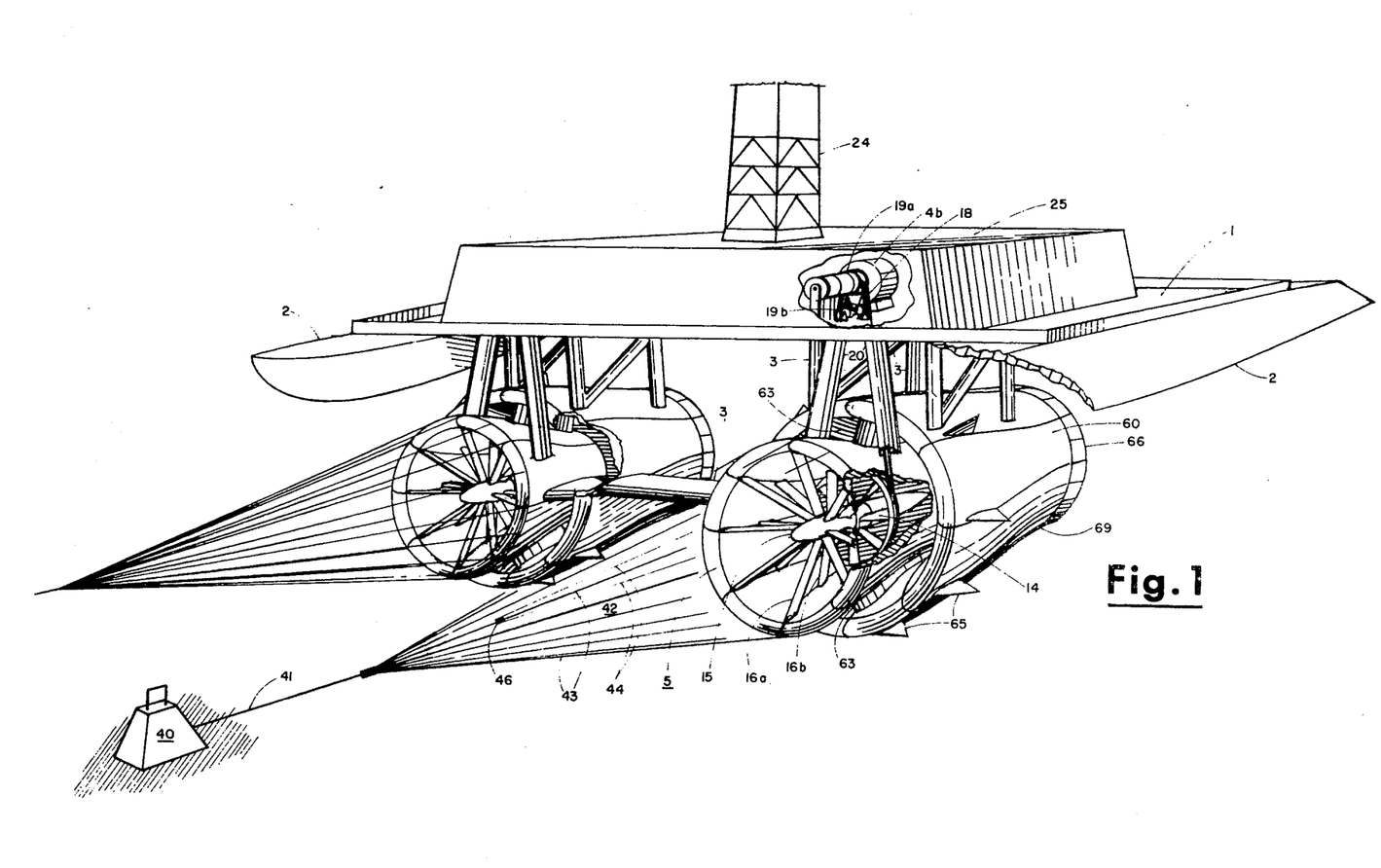
FIG. 1 is an isometric view of a pair of river turbines of the invention, mounted under a common float.
Figure 2:
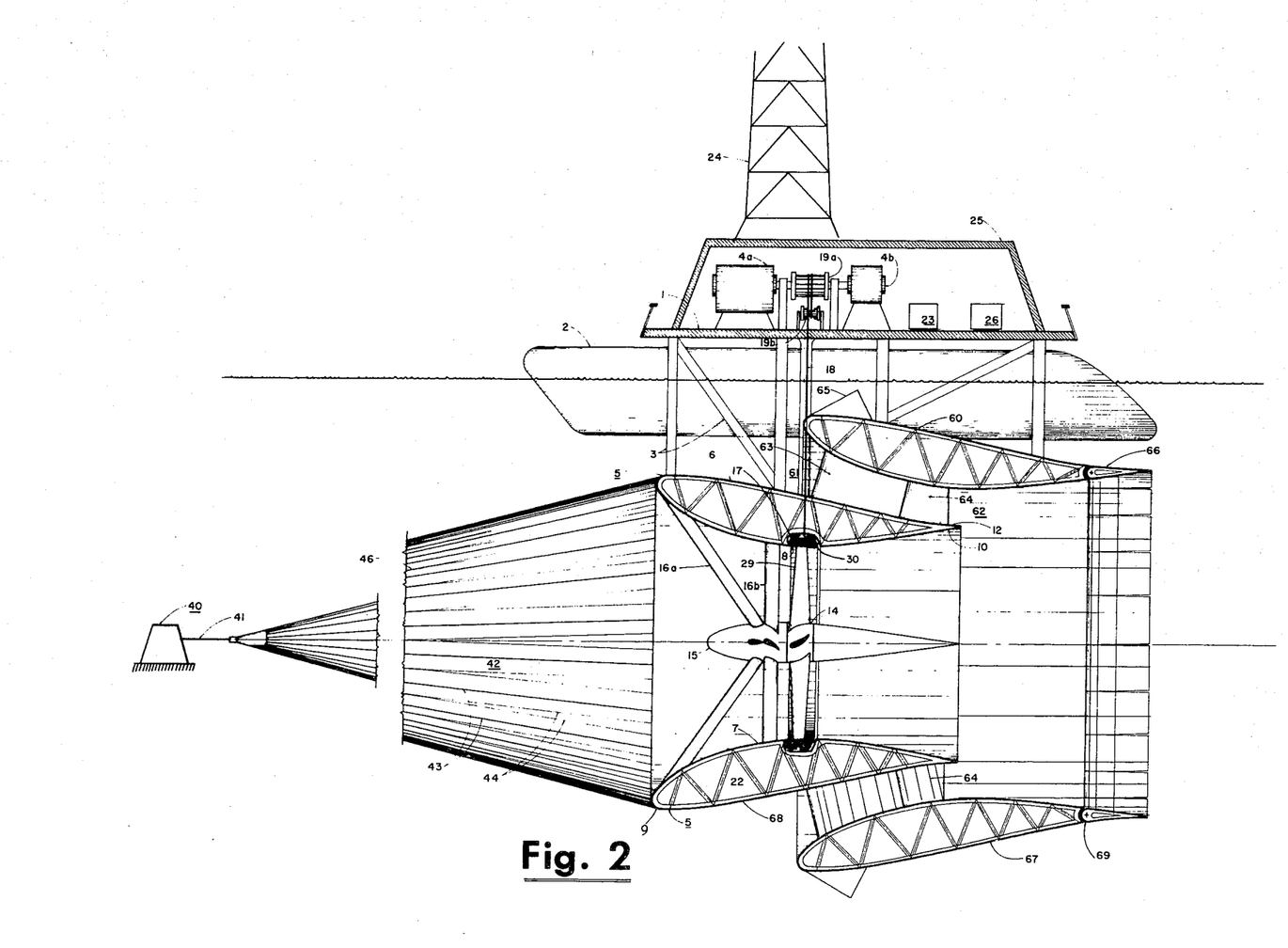
FIG. 2 is a longitudinal section of a single turbine of the invention.

FIG. 1 shows an isometric view of two of the nozzle and turbine arrangements of this invention in side-by-side arrangement. FIG. 2 shows a single nozzle of FIG. 1, in longitudinal section, mounted below a pontoon and machinery-deck structure, in a location within a river, where the river current impinges from the left, and flows away toward the right. In all the figures, corresponding elements carry the same designating numerals, even though their shapes may vary slightly from one specific version of the invention to another. Where the differences are so substantial as to cause confusion, separate designators are used.

In FIGS. 1 and 2, item 1 designates the deck of a boat-like structure, which is supported on structural framework 3, above two or more pontoons 2, spread apart in catamaran-like fashion, with space between and below each pair of pontoons. In this space there is located a primary nozzle structure 5, connected through elements of the structural framework 3 to pontoons 2 and the deck 1. Above the deck 1 is a cabin structure 25 and a transmission-line support tower 24. Mounted on the deck are electrical generators 4a and 4b, their drive pulley 19a, an idler pulley 19b, electrical control gear 26 and water pump means generally designated as 23.

The primary nozzle structure 5 as shown in FIGS. 1 and 2 is constituted of a shell 6 and a liner 7. The left, or front, end of shell 6 is smoothly joined to the entrance end 9 of liner 7, for low fluid flow resistance, both for entrance of a portion of the river current into a waterway through liner 7, and for the mainstream of river current passing around shell 6. Liner 7 continues from its entrance end 9 to a throat 8, which is the part of the waterway through the liner of least cross section. At the throat 8 is an annular recess 30 occupied by a shroud ring 17, which inter-relationship will be detailed subsequently and in FIG. 12. Downstream of the throat the liner 7 continues to a discharge section 10, at which section the cross section of the waterway through the nozzle has increased as the result of the flaring of the liner. As in known venturi practise, the liner should flare with an included angle of less than about 15°, preferably about 7°, in order to maintain attached flow of the river current portion through the waterway and to initiate and produce a diverging cone of this moving water portion.

Figure 17:
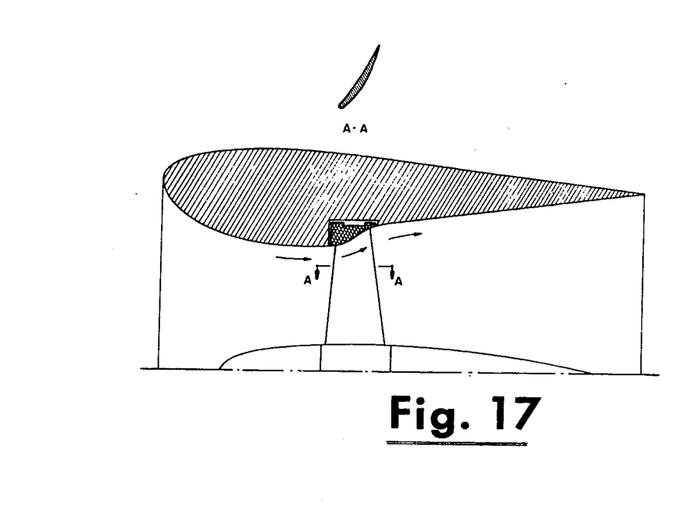
FIG. 17 shows the rim of a radial-flow turbine wheel, and the adjacent bell-shaped waterway.

In another form of the invention, as will be explained hereinafter, the liner downstream of the throat may enlarge immediately into a bell shape; after this enlargement, the rate of flare decreases to about 7°, as just mentioned. This is shown in FIG. 17.

The liner 7 has a circular cross section at the throat, but its cross section at other points along its length is not necessarily circular. The mouth 9, for example, may be rectangular, square, polygonal, or even trapezoidal in cross section, and likewise may be the discharge end 10. It is important however, for minimum fluid flow resistance that all transitions from one shape to anther, and from one section to another, be effected smoothly and not abruptly.

The shell 6, has an external shape in the form of a long gradual change from the connection at its front or entrance end to its discharge end 12, which is joined smoothly into connection with the discharge end 10 of the waterway. The gradual change is such that shortly before the junction, the surface of the shell, near its exit end 12, has at least begun to flare away from the axis of the nozzle, whereby that layer of the mainstream of the river current passing along this surface is deflected away from the axis into the beginning of a generally conical diverging sheath of mainstream water surrounding the similarly diverging portion of river current passing out of the waterway.

In FIGS. 1 and 2, the divergence of the shell 6 at its discharge end 12 is slight, being hardly noticeable in the drawing. In this particular instance, such a slight divergence or flare is sufficient, because the other structures surrounding the primary nozzle and shortly to be described are the main causes of the generation of the flaring sheath of mainstream water. In other forms the flaring of the primary nozzle is much larger, as in FIGS. 3, 4, and 5.

The primary nozzle 5, having the previously described outside shell 6 and the inside liner 7, has a space or compartment between these surfaces in which are located structural elements supporting the surfaces. In a preferred form of construction, the primary nozzle is comprised of eight segmental modules, each a segment of an octagon; each module carries not only one-eighth of the shell 6 and one-eighth of the liner 7, but also side partitions where the modules after assembly meet one another. Especially for very large river current turbines, where the turbine sheel diameter might, for instance, exceed 60 ft., the modular construction greatly facilitates construction of the nozzle. The individual modules can be made in a boat yard, using steel plate fabrication technology well known in barge manufacture. After constructon, each module can be floated to the power generator site, and there they can be assembled.

The primary nozzle's compartments constitute an important source of adjustable buoyancy for the river turbine. By pumping water out of upper compartments, but leaving more or less water in lower compartments, a range of centers of buoyancy can be established as needed for various river conditions.

Within the waterway of primary nozzle 5 there is a turbine wheel 14, having a central shaft 13 coaxial with the waterway's throat 8, blades 29, and a shroud ring 17 attached to the outer ends of blades 29. The turbine wheel is more easily seen in FIG. 14. In this form of the invention, the turbine is arranged for straight-through axial flow. In another form shown in FIG. 17 the turbine blades and shroud ring are so arranged that the flow enters axially, but turns and exits outwardly, with a considerable radial component of flow. This is the form of turbine wheel used with the bell shaped tail region in the waterway as previously mentioned.

Figure 13:
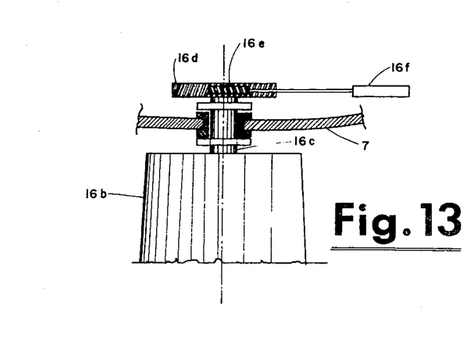
FIG. 13 shows a detail of a means for steering or canting the strut vane upstream of the turbine wheel.
Figure 14:
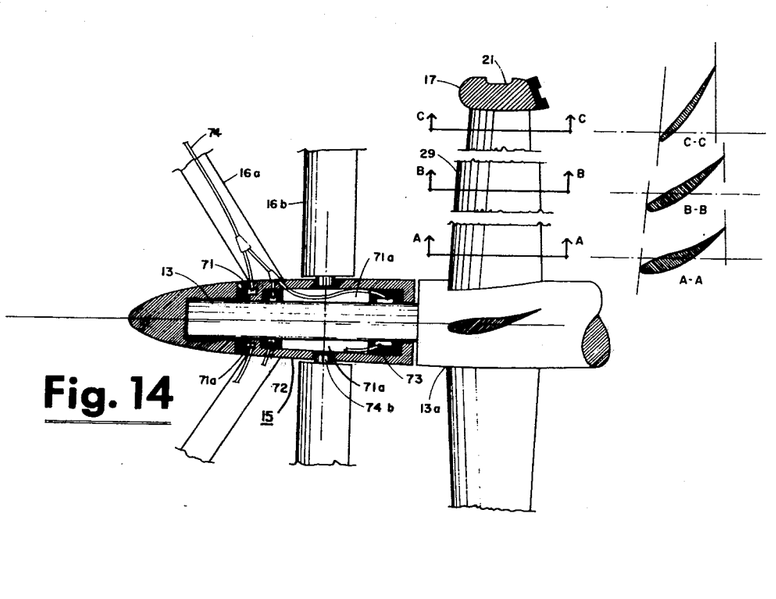
FIG. 14 shows a detail of the water bearing for the turbine wheel shaft.

In either case, as shown in FIG. 14 the turbine shaft is mounted in bearings carried in bearing block 15, which is in turn supported centrally within the waterway with struts 16a and strut-vanes 16b. The strut-vanes 16b as shown in FIG. 13, are, as their name indicates, both struts supporting the bearing block, and vanes directing the axially flowing water into a helical path, the better to impinge on the blades of the turbine wheel in direction to achieve the highest efficiency of energy extraction. For control purposes, these strut vanes can be rotated on their individual axes, to increase or decrease their effective pitch; the control means may be any of numerous kinds, such as hydraulic piston-cylinder actuators, operating through mechanical linkages, or may be hydraulic motors 16f operating on screws 16e meshing with pinions 16d on the strut-vane shafts 16c, as shown in FIG. 13.

It is well known that river currents may entrain waterlogged logs and other massive objects. Such objects, if carried into the blades of the turbine, could cause serious damage. In order to prevent such damage, it is a feature of the present invention, to provide upstream of the mouth of the waterway through primary nozzle 5, a trash screen 42 in the form of a cone of cables 43 and 44. The open end of the cone of cables is juxtaposed to the open end of the waterway entrance 9, and the tip of the cone is attached to anchor cable 41 leading from an upstream anchor 40. At the open end of the cone, each cable is individually shackled with clevises to cable attachments (not detailed) distributed around the periphery of the waterway mouth 9. Some of the cables designated 43 are full length, extending the entire distance from the anchor cable 41 to the mouth clevisses. If all the cables extended the full length, however, and were spaced sufficiently close to prevent trash entrance at the large end of the cone, the cable density near the smaller end of the cone would be too great. Accordingly, some of the cables (designated 44) extend only part of the way and are clamped, as at 46, to the full length cables. Although only two lengths of cables are shown (those designated 43 being full length) it is within the spirit of this facet of the invention to use several lengths with additional branches as desired. It will also be clear that should the size of the trash require it, the trash screen's open end could attach to the secondary nozzle, rather than to the primary nozzle.

The cone-of-cables trash screen inevitably introduces some resistance to the flow of water through the waterway and turbine, which is an undesirable situation. In order to minimize the flow resistance, the trash screen is built with an interior included angle near 30°, because near this angle the tilt of the individual cable axis relative to the line of river flow offers an elliptical cross section from the actually round cable, at which section the fluid flow resistance is a minimum.

Figure 12:
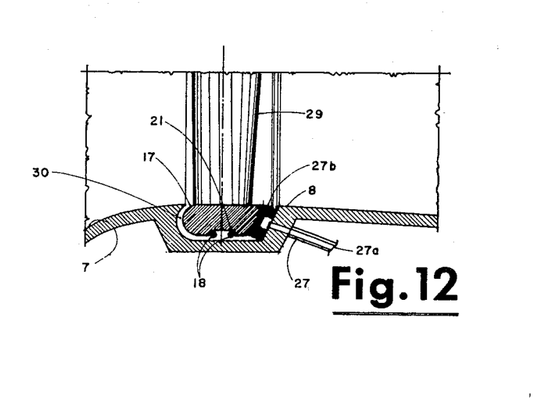
FIG. 12 shows the rim of the turbine wheel, with its pulley groove, belt, and waterbearing.

It was previously mentioned that the shroud ring 17 of turbine wheel 14 is let into an annular recess 30 in the throat 8 of the waterway. This detail and others related are shown in FIG. 12. It is important for minimum water flow resistance that the inner face of the shroud ring 17 be a smooth extension of the adjacent waterway surface in the region of throat 8.

An aspect of the present invention is the use of the shroud ring, not only as structural support for the outer ends of the turbine blades 29, but also for transfer of the axial load from the blades to the surrounding nozzle structure. For this purpose the downstream side of the annular recess 30 is provided with a water bearing porous structure 27b, and a suitable pressurized supply of water 27a through jets 27, whereby deflection of the shroud ring under pressure of the river current against the turbine blades is cushioned in a layer of water maintained in the space between the edge of the shroud ring and the adjacent wall of the annular recess.

There may alternatively or additionally be a set of mechanical roller bearings disposed in this space. An advantage of the mechanical bearing is that in case of failure of water supply to the water bearing, catastrophic destruction of the river turbine would not result.

FIG. 12 also shows that the outer face of the shroud ring 17 is provided with groove 21 in which a belt or belts 18 ride. Conveniently, the belt 18 is a round, very long belt extending about 1⅔ wraps around the shroud ring, and upward through two channels 20 to the driven pulley 19a and the idler pulley 19b, as shown in FIG. 2. Of course, the load need not be taken in a single endless belt, and multiple belts may be used.

The tensions in the two parts of the belt 18 have their major vector components in the upward direction, tending to support at least part of the weight of the turbine wheel. Thereby the load carried on the turbine wheel axial bearing is reduced, and less costly bearing structure is possible.

The turbine wheel axial bearing as shown in FIG. 14 may be of known construction utilizing for example water bearings 71, 72, 73 as practised in shafts for ships propellers.

Water bearing 71 is a porous block provided with a chamber and passageway 71a, and a supply of pressurized water through line 74. Water bearing 71 is arranged at the front surface of the stationary bearing block 15 supported by struts 16a and strut vanes 16b within the throat. The back surface of a nosepiece carried on shaft 13 bears against the waterbearing 71, whereby the axial thrust of the turbine wheel is absorbed. Water continuously supplied through the porous block maintains a cushioning film to prevent metal-to-metal contact in the structure.

Similarly porous blocks 72 and 73 are supplied with water, and act as radial waterbearings. It is desirable of course, that the bearing be enclosed in a well streamlined frontal enclosure as depicted in FIG. 2. The stub shaft extending rearwardly of the turbine wheel should also be well streamlined.

The turbine wheel 14 is made up of a hub on shaft 13, a shroud ring 17 and a set of blades 29 attached at one end to the hub and at the other to the inner side of the shroud ring. Following conventional hydrodynamic principles, each blade is set at an angle to the axis, at the hub, and because the blade is formed with a twist along its length, this angle changes along the length as indicated by the sections a—a, b—b, and c—c on FIG. 14.

The blade itself for highest efficiency of the turbine must be very carefully designed, with the most effective profile in each radial section, and changing profile from axis to shroud end. An important consideration is the avoidance of cavitation, because cavitation would not only increase the frictional drag (thereby converting mechanical energy into wasteful heat) but also might cause destructive erosion of the blade surface. It is an advantage of the present invention that the turbine wheel will be rather deeply submerged below the water surface, and the differential head of water between the surface and the uppermost edge of the turbine will be of considerable magnitude; the greater this head, the greater the absolute pressure in the water, and the more that the pressure must be reduced before cavitation will take place.

However, even this advantage may not be sufficient, and the blades' profiles must be selected using known hydrodynamic principles so that the pressures on the back sides of the blades (where pressures are lowest) will not get so low as to permit cavitation to occur. Blades, which, by their shape delay the formation of negative peaks of pressure are the best. Toward the outer ends of each blade the sections are accordingly thinner, and are tilted to cut into the water at a more acute angle.

Toward the axis end of each blade, the relative viscosity is smaller for a given number of revolutions per minute of the wheel, and the section may both be thicker and be tilted more squarely to the rotational direction.

For the wheel structure shown in FIG. 14, with the central ends supported in the hub and the radially outward ends supported in the shroud-ring 17, which is in turn supported in the recess 30 with water bearings 27b, each blade can be considered a complex beam, supported at both ends, and it must be designed accordingly.

In order to obtain the desired hydrodynamic shapes together with large strengths and reasonable cost, it is almost essential that modern fiber reinforced plastics technology be utilized. Preferably, the blades are made with fiberglass/epoxy construction, with rigid foam core in the thicker sections. Continuous filaments of glass extend lengthwise of the blades, for bending stiffness; for torsional strength, belts of filaments extend diagonally across the widths of the blades. Where a core is used, it may be of rigid polyurethane preshaped to establish the basic shape of the blade.

Figure 15:
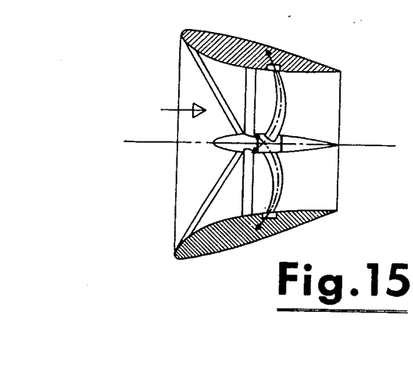
FIG. 15 shows a turbine wheel with blades bowed into catenaries with axes of symmetry parallel to the turbine wheel axis.
Figure 16:
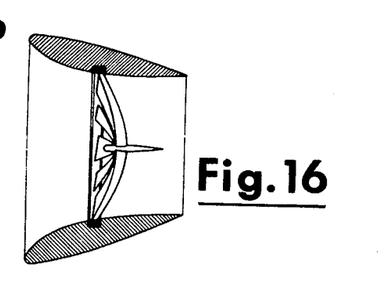
FIG. 16 shows a turbine wheel with blades bowed into half catenaries with axes of symmetry coincident with the turbine wheel axis, and with the central bearing structure eliminated.
Figure 16B:
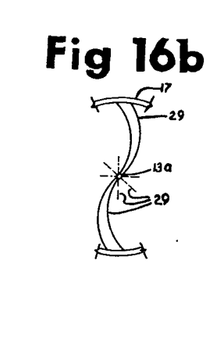
FIG. 16b is another catenary variation.

For very large turbine wheels, where the force of the river current exerts a large bending force on the blades, it may be difficult to obtain sufficient resistance to bending while maintaining desirable blade sections. Some solutions to this problem are forms of a catenary blade, as shown in FIGS. 15, 16, and 16b. In construction of FIG. 15 the blade is deliberately formed into a bowed U-shape, in the direction toward which the current tends to force it. The preshaping is sufficient to make the blade when under load a catenary with axis of symmetry between its two ends; the forces in it are then mainly pure tension, and any tendency to further bending in the direction parallel to the axis is eliminated. Such a construction takes full advantage of the excellent strength characteristics of modern composite materials.

The above described catenary blade construction can be carried a further step, as shown in FIG. 16. In this version each blade can be designed to be (when under load) approximately one half of a symmetrical catenary with axis on the centerline of the wheel, and extending entirely across the diameter of the turbine wheel. By such a design, the forces parallel to the axis are transformed into tension in the catenary, and the thrust on the central shaft is eliminated; all of the load of the impulse of the river current is transferred directly to the shroud ring and through its water bearings 27b to the surrounding primary nozzle structure. Having thus eliminated all of the axial thrust forces, it becomes possible also to eliminate the central support of the wheel, by locating trunnion bearings around the outside of the rim of the shroud, in order to support the turbine wheel radially as well as axially. These bearings are preferably water bearings like 27b, but may also be rollers supported in bearing blocks as conventionally in the support of large rotating horizontal structures such as ball mills and rotary kilns. With both the axial and the radial supports eliminated from the wheel, the entire central hub 15, its bearings 71, 72, 73 and its struts 16a and 16b is eliminated as indicated in FIG. 16.

A further step in the use of catenary design of the blade is to curve the blade in the circumferential direction in which it is thrust by the impinging water currents, as well as in the axial direction. This design is indicated in FIG. 16b which shows in fragmented fashion a face-on view of a turbine wheel. Only two complete blades 29 are shown, the others being indicated by the dotted lines extending from the central hub. Each of the blades 29 has a catenary shape as seen from this viewpoint, as well as the catenary shape seen in FIG. 16. Thereby all bending forces in any direction are eliminated, and the forces within the blade are tension. As in FIG. 16, there being no axial thrust, the hub 13a serves only as a connector for attaching the central ends of the blades to one another. Accordingly no central bearing is needed, and none is shown.

Figure 11:
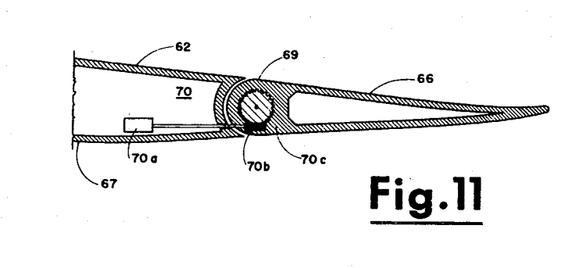
FIG. 11 shows a hinged petal flap at the rear edge of the secondary nozzle.

This discussion will now cover the structures external to the primary nozzle, beginning with those shown in FIG. 1 and FIG. 2. Seen in side view in FIG. 2 are two of a set of vanes 63 extending radially outward from the outside surface 6 of primary nozzle 5. These vanes in FIGS. 1 and 2 are not only vanes as such for directing the flow of mainstream river current past the exterior of the nozzle, but in this form of the invention are also structures supporting the annular secondary nozzle 60, coaxial and in partial overlap with the primary nozzle 5. Thus supported the mouth 61 of the secondary nozzle forms with the exterior of the primary nozzle 5, the beginning of an annular passageway past the remaining surface of the primary nozzle. The vanes 63 extend longitudinally through this annular passageway. While vanes 63 may be straight as depicted in Section EE of FIG. 7, they preferably are all bent in a helix, as in Sect EE of FIG. 8, whereby the passing mainstream current is directed to begin to flow as a vortex. The bent downstream edge of the vane is depicted in FIG. 2 at 64, and in FIG. 9. It is in some circumstances desirable to be able to change the intensity of this helical motion, and this change is provided for, by making the trailing edge 64 not as a simple bent fixed edge, but rather as an adjustable "aileron" as in the section in FIG. 9, with conventional adjustment means not detailed. Such means might include as some of the possible alternatives the following: (1) cables extended from levers on the pivot shafts of the ailerons (2) push-pull slides on bent tracks, with hydraulic piston actuators (3) worm-and-pinion drive on the pivots, with hydraulic motors to drive the worms, similarly to FIG. 13, and FIG. 11.

The secondary nozzle 60, in a manner similar to the primary nozzle, is designed with a liner forming an inside surface and defining the aforesaid annular passageway outside the primary nozzle. The secondary nozzle also has an exterior surface, and a space between the liner and the exterior surface containing struts and braces, and constituting a watertight compartment, or plurality of compartments, which can be utilized in obtaining the desired buoyancy characteristics of the entire turbine. Like the primary nozzle, the secondary nozzle is made in segments with segmental walls as well as liner and exterior surface. It is prefabricated, floated to the site as individual barge-like segments and there assembled into the nozzle.

The inside surface of the liner converges from its mouth 61 toward the adjacent primary nozzle's exterior surface, so that the annular passageway is of decreasing cross sectional area as it approaches the discharge end of the primary nozzle, so that the mainstream water flowing through this passageway is accelerated to a higher velocity, at the region 62.

As the secondary nozzle's liner passes downstream beyond the adjacent discharge end of the primary nozzle, its cross section begins to increase; in other words, the high velocity sheath of mainstream water now is guided by the flaring of the liner into a diverging conical sheath around the portion of the river current emitted from the primary nozzle.

From hydrodynamic principles it is known that the energy of a flowing water system is made up principally of two components, the kinetic energy, which varies as the square of the linear velocity, and the potential energy, which is measured by the static head relative to any preselected datum. By careful attention to streamlining and fairing of guiding surfaces, and avoidance of separation of flow by maintenance of the earlier stated 7° flare, it is possible with only minor loss of energy into heat because of turbulence and friction, to transform kinetic energy into potential energy, and vice versa. This transformation is expressed in the well known Bernouilli's theorem, which is simply one form of the energy balance on the flowing water.

the portion of the water which was accelerated to high verlocity, then flowed through the turbine vanes and gave up energy as mechanical output through the turbine's belt 18, comes out of the turbine vanes at reduced energy. The reduction may be in the velocity, in the static pressure, or both, depending upon the turbine and waterway design. In the straight-through axial turbine, with the same flow cross section immediately downstream as at immediately upstream, the velocity achieved by acceleration through the converging primary nozzle entrance section can not change, because the total volumetric flow is constant. Accordingly, the static pressure, which was already considerably lowered because of the conversion in the converging section into additional kinetic energy of the higher velocity, is further reduced in passage through the turbine, by transfer out of the liquid into the turbine's mechanical output. As the portion of river current downstream of the turbine increases in cross section in the diverging section its residual kinetic energy is partially transformed back into higher static pressure potential energy. When the pressure has thus been raised sufficiently in the flaring downstream cone of water, it may again be blended with the surrounding mainstream water.

With the turbine wheel of the radial discharge type shown in FIG. 17, it is possible for at least a portion of the kinetic energy to be converted directly to mechanical energy, with less reduction in pressure. The reason is that the radial discharge and bell-shaped tailpiece to the waterway allows the high linear velocity water passing through the turbine to drop to a lower linear velocity because it is flowing from a smaller to a larger cross section, the mass flow of course being constant throughout the waterway. To the extent that the linear velocity can be dropped, the equivalent mechanical energy can be removed without change of pressure. This analysis neglects for the moment, that any feature introducing more turbulence into the flowing liquid will thereby increase the frictional losses, by transformation of some of the systems kinetic and potential energy into heat. Effective use of the radial discharge turbine and bell shaped waterway requires careful design to minimize the frictional losses.

However, it may be difficult to maintain the flaring cone of water sufficiently separate from the surrounding mainstream, unless special steps are taken. These special steps are the result of the shaping and structures on the outside of the primary nozzle. The formation of the protecting sheath of mainstream water enables the continued conversion of the portion passing through the turbine from kinetic to pressure energy.

The high-velocity sheath developed by acceleration of mainstream water through the annular passageway between primary and secondary nozzle, has, as a result of its acceleration, a reduction in static pressure, so that there is reduced tendency of the mainstream river current to flow into the axial region downstream of the nozzle, whereby the environment for the continued expansion in cross section in the flaring conical portion is favorable. The exterior surface of the secondary nozzle 60 is also structured to favor the formation and protection of the diverging conical sheath of mainstream water. Proceeding rearwardly from the mouth end 61, the exterior surface gradually and smoothly moves radially inward, toward the turbine axis, but as the tail end 67 is approached, the curvature reverses, still gradually, and begins to flare outward, away from the axis, such that the mainstream passing this surface is directed outwardly, to conform generally with the exterior of the conical sheath emitting from the inside of the secondary nozzle.

To the same end, near the forward part of the exterior surface of the secondary nozzle there may be attached a set of radially extending delta-shaped vanes 65, the rear edges of which are bent to deflect the passing mainstream into a vortex, preferably in the same direction of rotation as the rotation of the sheath as impelled by vanes 63.

The secondary nozzle shown in FIG. 2 has an exterior surface that decreases in diameter in the flow direction for some considerable distance, before its diameter then flares as earlier described. It is important that the mainstream flowing past the region of decreasing diameter should remain "attached" (in the parlance of the hydrodynamicist) and although the limiting angle of about 7° has been specified for the rate of convergence of this part of the nozzle, circumstances may prevent this small angle being achieved. Should this be the case, the delta vanes 65 can be set at a steeper "cant," or angle of attack, whereby each will cause a small vortex to develop in the wake of the vane. These small vortices will tend to keep the mainstream flow attached by replacing the boundary layer energy all the way to the nozzle's beginning of flare, or even to its trailing edge.

In the preceding discussions it has been mentioned that this invention may be practised with a simple primary nozzle flaring from the throat toward the discharge end. It has also been pointed out that greater efficiencies may be achieved through the use of the exterior vanes, secondary nozzle, and other structures, as well as through the flaring external surface of the primary nozzle. There are some other variations of primary nozzle configuration to which the invention is also applicable.

Figures 3, 5:
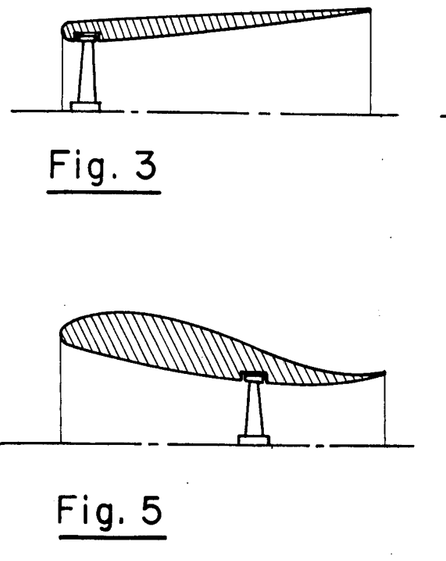
FIG. 3 shows a primary nozzle of the invention in half section, this version having no preconvergence, and a full tailpiece.
FIG. 5 shows a primary nozzle version with converger, and minimum tailpiece.

FIG. 3 shows in half section a version in which no preconverger is utilized, the throat of the nozzle falling immediately adjacent to the mouth. In this version, the turbine wheel receives the intercepted portion of the river current essentially at its prevailing velocity, removes energy from it, then diffuses the portion as already taught into a conically diverging stream of decreasing velocity and increasing pressure, before blending with the mainstream.

Figures 4, 6:
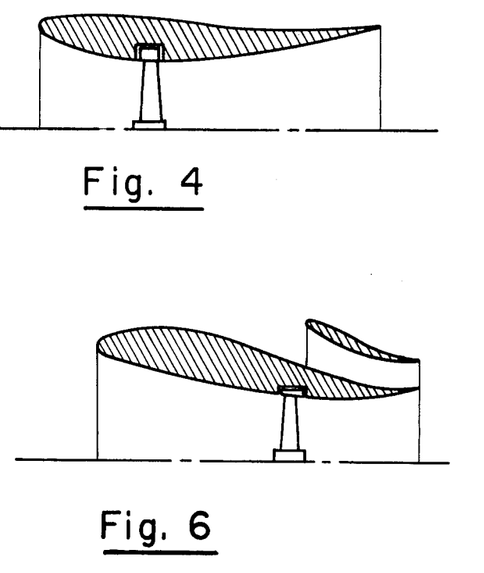
FIG. 4 shows a version of primary nozzle with converger and full tailpiece.
FIG. 6 shows the addition of a secondary nozzle.

In FIG. 4 a preconverger is used with the primary nozzle, which distinguishes FIG. 4 from FIG. 3. However, the nozzles of both FIG. 3 and FIG. 4 have an elongated flaring tail section, the advantage of which is to maintain smooth diffusion of the diverging stream until substantial pressure equilization is secured.

In FIG. 5 is shown a primary nozzle having a relatively large preconverging section and a relative short tail section. This version has its exterior surface contoured in principle like the primary nozzle in FIG. 2.

Figure 7:
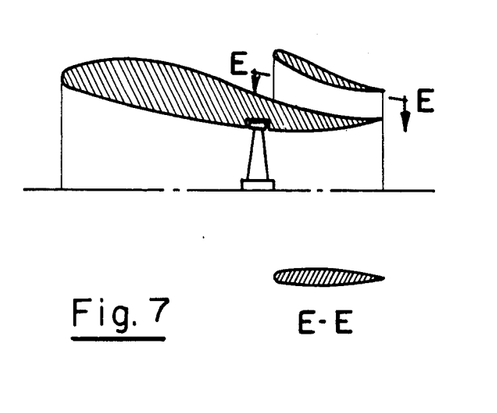
FIG. 7 shows a straight vane in the annular passageway between primary and secondary nozzle.
Figure 8:
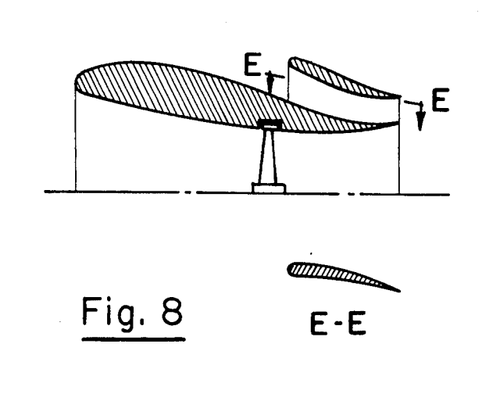
FIG. 8 shows a bent or canted vane in the annular passageway.
Figure 9:
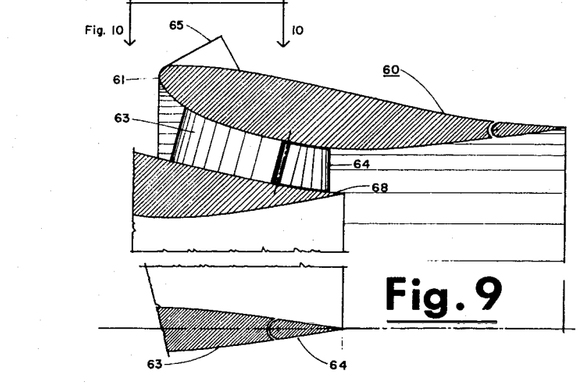
FIG. 9 shows a hinged "aileron", and a delta vane on the secondary nozzle.
Figure 10:
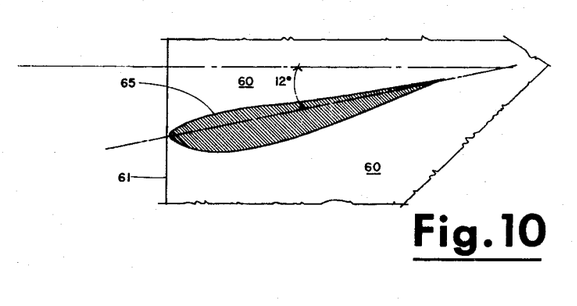
FIG. 10 shows a detail indicating that the delta vane is bent or canted.

In FIGS. 3, 4, and 5 only the primary nozzle forms have been presented, both as to inside and exterior. In FIGS. 6, 7, and 8 are shown the stepwise additions of structure which may be made within the scope of this invention, in further improving the control of mainstream flow and sheath formation on the outside. Each aspect of the structures has already been discussed. These additions may be made to any of the forms of primary nozzle, as already described.

It was earlier mentioned that the deck 1 carries certain auxiliaries, and these will now been dealt with in more detail. Above the cabin supported from the platform is a transmission tower 24 for the support of electrical transmission cables for conducting power generated with this river current turbine. If submarine cable of suitable voltage and power specification be available, it may be substituted for all or part of the overhead cable.

Generator 4a is provided for the main purpose of this invention, namely, to generate large amounts of electrical power for utilization on shore. Since most power grid systems are based on 60 herz, this generator will preferably be such a one, with output voltage and number of phases suitable to the particular utilization. In order that the produced power may be fed into existing grids into which other generating sources are also feeding, it will be essential that the synchronization and frequency, as well as the voltage produced, be of highly precise values. To this end, conventional electrical control gear is provided at 26. Signals showing any unwanted deviations will be developed by this control gear, and fed back to the generator speed and excitation control system, to cause the generator to keep in step with the power grid.

Generator 4a is shown as a single unit, but it will be entirely clear additional generators such as 4b could be provided and with suitable clutches (not shown) and electrical controls, driven from the same energy source, being brought "on line" when demand for power requires. In this manner each generator when running will be producing power at operating conditions near its optimum efficiency.

Also shown on the platform 1 is the generally smaller generator 4b, which may be used to provide low voltage power for immediate utilization in connection with water pumps 23, air compressors, not shown, control systems including 26 and other needs for electrical power upon and near the platform. For idle and start up purposes, in general it will be necessary to have a supplemental engine-driven generator, and suitable fuel tanks. These are conventional, and are not shown in the drawings.

One of the means for speed control on generator 4a is by way of pulley 19a, which may be a variable diameter pulley with means for adjusting its diameter "on the fly" as required in response to signals from the control system 26. Other means will be dicussed later. At 19b is shown an idler pulley, by which the tightness of belt 18 may be held constant, despite changes in diameter of pulley 19a, and despite stretching of the belt. Idler pulley 19b may be continuously and automatically reset by conventional drive means and control means not shown.

Water pumps 23 are designated generally, but in actuality may be of more then a single specification. For example, some will be suitable for pumping water out of the compartments of the nozzles, others for pumping water into water-bearing devices such as 15 and water jets such as 27.

Whereas FIG. 1 shows two river turbine units of this invention in side by side arrangement, it is obvious that single units, or multiple units of more than two turbines can be used without departing from the spirit of the invention. Indeed, when two or more units are coupled side by side, it is possible to ompletely eliminate the pontoons 2, or at least to reduce their number, because adequate flexibility in adjustment of buoyancy is available through the compartmentalization at the several nozzles.

EXAMPLE

By way of example to illustrate the ability of river turbines of this invention, there are tabulated below some typical dimensions that would apply to a single turbine for use in a river of at least 100 ft. depth and breadth. Many reaches of the Mississippi River have such a depth, and many times this breadth.

| PRIMARY NOZZLE: | Mouth diameter | | 66 ft. |
|---|---|---|---|
| | Throat Diameter | | 40 ft. |
| | Exit Diameter | | 48 ft. |
| | Overall Length | | 60 ft. |
| | Tailpiece Flare | | 7° |
| | Tailpiece length, throat to exit | | 28 ft. |
| | Exterior Flare | last | 8 ft. |
| SECONDARY NOZZLE: | Mouth Diameter | | 90 ft. |
| | Throat diameter(at primary exit) | | 68 ft. |
| | Exit Diameter | | 76 ft. |
| | Vortex Vanes 65 | height | 5 ft. |
| | Overall Length | | 70 ft. |
| | Tailpiece Flare | | 7° |
| | Tailpiece Length throat to exit | | 40 ft. |
| | Exterior Convergence | | 60 ft. |
| | Exterior Flare | | 10 ft. |
| | Overlap of Primary and secondary nozzles | | 30 ft. |
| | Sheath thickness at departure from primary exit | | 9 ft. |

With an upstream river velocity of 7 knots, the mechanical power delivery to the electrical generators is expected to be equivalent to 7500 KVA.

Several modes of operation of the invention have been disclosed in the foregoing specification, and others will be evident. It will be understood that various modifications may be made within the scope of the claim, without departing from the spirit of the invention.

What we claim is:

1. In a river current motor of the type made up of a primary nozzle with longitudinal horizontal axis parallel to the river current direction, for collecting a portion of the river current from the mainstream of said current, the said primary nozzle having in sequence along its axis an entrance end connected to a throughgoing waterway, leading to a throat and then through a tailpiece to a discharge end, and coaxially supporting within the throat an axial entrance turbine wheel to which is connected means for transferring mechanical rotational energy to external utilization means, the improvement comprising the following:
    a. the flaring of the waterway from the throat to the discharge end to initiate and establish a gradually increasing cross-section of the collected portion of said river current from the time it passes said turbine wheel, and
    b. the flaring and structuring of the exterior of said primary nozzle having means to initiate and establish the formation of a diverging conical sheath of mainstream river current around the said collected portion as said portion exits the discharge end of said primary nozzle,
    the provision in the said structuring of a set of radially extending vanes on the exterior surface of said primary nozzle, each vane of said set having a helically bent trailing edge, all said bent trailing edges being turned in the same helical direction, whereby to induce helical rotation into said diverging conical sheath.

2. The river current motor of claim 1, with which a trash screen is provided in the river upstream of the entrance end of the primary nozzle, the trash screen comprising a conical array of cables on horizontal anchor cable and the base of the cone forming an open end of at least as large a cross section as the entrance end of the primary nozzle, to which the said open end is juxtaposed and attached.

3. The river current motor of claim 2, in which the cone has an included angle of about 30°.

4. The river current motor of claim 1, having a secondary nozzle with a passageway having a mouth, throat and exit coaxially supported in partially overlapping and surrounding relationship with the tailpiece of the said primary nozzle, with clearance between the lining of the passageway of the secondary nozzle and the exterior surface of the primary nozzle forming an annular passageway for the flow of mainstream water past the overlapped exterior surface of the primary nozzle.

5. The river current motor of claim 4, in which the exterior surface of the secondary nozzle is provided with a set of delta-shaped vanes extending outwardly from the exterior surface and formed into fragments of at least one helix, each such helix spiralling in the same direction as any other.

6. The river current motor of claim 1, positioned in a river current, and (1) tethered from an upstream anchor through (2) an anchor cable connecting from said anchor to the tip of a trash screen in the form of a horizontal conical array of cables extending over at least part of the slant length of said array from said tip to an open end forming the base of said array, each cable terminating in an attachment around the periphery of (4) the mouth of the said primary nozzle of claim 1, said primary nozzle having (5) a waterway converging from said mouth to (6) a throat of lesser cross section than said mouth, said throat provided with (7) an annular recess, said waterway flaring from said throat to (8) a discharge end removed from said throat by a distance of at least one half diameter of said throat, the angle of flare being less than 15°, preferably about 7°, (9) an axial-flow turbine wheel coaxially mounted in (10) a water-bearing structure supported on (11) struts and (12) strut-vanes within said waterway at said throat, said turbine wheel having vanes extending from hub to (13) a shroud-ring rim positioned with the said annular recess of the throat and rotatable against (14) water bearings located downstream of said rim and bearing against it, said rim carrying at least (15) one pulley groove in its exterior face, (16) an endless belt riding in said groove and proceeding through (17) channels extending upwardly to (18) variable-diameter pulley means driving (19) electrical generators, said primary nozzle having (20) an exterior surface coaxial with said waterway, said exterior surface having (21) a mouth joined in watertight fashion to the said mouth of the waterway, and (22) a discharge end likewise joined in watertight fashion to the said discharge end of the waterway whereby (23) a watertight compartment is formed between said waterway and said exterior surface, (24) pump means connected to said compartment for controllably removing water therefrom, said exterior surface of the primary nozzle having (25) a smoothly curved surface that flares adjacent to its discharge end at an angle approaching the aforesaid angle of flare of the waterway, (26) a set of strut-vanes extending radially outward from said exterior surface, said strut vane being provided with (27) aileron-like flaps hingedly attached to the trailing edges of said strut vanes and with (28) control means for adjusting the angle of set of said flaps, (29) a secondary nozzle mounted externally to said strut-vanes, coaxial with the primary nozzle and in partially overlapping relation with the discharge end of the exterior surface of the primary nozzle, said secondary nozzle having (30) a mouth, (31) a throat and (32) a discharge end and together with the overlapped primary nozzle forming (33) an annular passageway there between, said annular passageway having a cross section at its mouth greater than the cross section at its throat in the area ratio of 1:1 to 3:1, said passageway from its throat to the discharge end flaring outwardly at an (34) angle like the angle of flare of the waterway within the primary nozzle, (35) the exterior surface of said secondary nozzle being joined in watertight fashion to the mouth and discharge end thereof and forming therebetween a watertight compartment (36) pump means connected to said compartment to control its water content (37) the exterior surface of said secondary nozzle proceeding smoothly from the mouth to the discharge end of the secondary nozzle, and flaring at least in the region near the discharge end, with an angle of flare approaching the angle of flare of the adjacent passageway, said secondary nozzle carrying at its discharge end (38) a set of petal flaps hingedly attached to said discharge end and provided with (40) control means for establishing a desired degree of flare and said secondary nozzle carrying adjacent its mouth end on its exterior surface (41) a radially standing set of delta-shape vanes canted to fall within at least a single helix around the exterior surface.

7. The river current motor of claim 4, with which a trash screen is provided in the river upstream of the entrance end of the primary nozzle, the trash screen comprising a conical array of cables on horizontal axis, the tip of the cone being attached to an upstream anchor cable, and the base of the cone forming an open end of at least as large a cross section as the entrance end of the secondary nozzle, to which the said open end is juxtaposed and attached.

8. The river current motor and of claim 7, provided with a trash screen comprising a conical array of cables, in which array some of the cables extend the full length of the array from the tip of the cone to the base of the cone, whereas some others extend only part of the way from the base of the cone toward the tip and are clamped at their upstream ends to the adjacent full-length cables, whereby to improve the distribution of cable density.

9. The improved river current motor of claim 1, in which the turbine wheel carries at its outer periphery a shroud ring, the throat of the waterway has a cooperating annular recess receiver the shroud ring, the said ring being positioned within the said recess and rotatably supported therein on radial and thrust bearings positioned within the said recess.

10. The structure of claim 7, in which the said bearings are of water bearing type and in operation are supplied with pressurized water lubricant.

* * * * *